May 26, 1953  R. J. OLANDER  2,639,627

CLUTCH SHIFTING MEANS FOR HAND BRAKES OF RAILWAY CARS

Filed Dec. 15, 1950  4 Sheets-Sheet 1

Inventor:
Roland J. Olander.
By Henry Fuchs
Atty.

Inventor:
Roland J. Olander.
By Henry Fuchs
Atty.

Inventor:
Roland J. Olander.
By Henry Fuchs
Atty.

May 26, 1953   R. J. OLANDER   2,639,627
CLUTCH SHIFTING MEANS FOR HAND BRAKES OF RAILWAY CARS
Filed Dec. 15, 1950   4 Sheets-Sheet 4
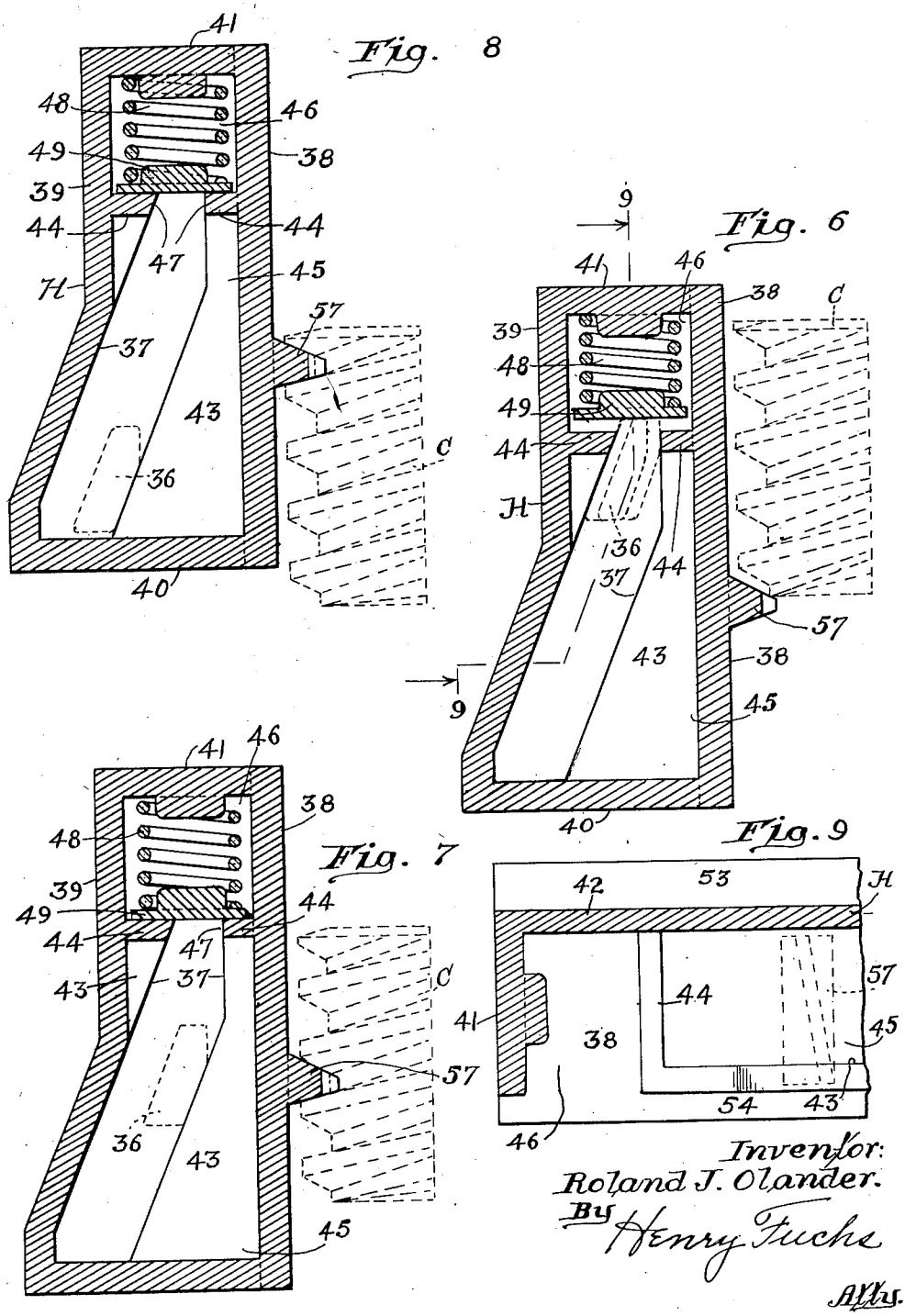

Patented May 26, 1953

2,639,627

UNITED STATES PATENT OFFICE 2,639,627

CLUTCH SHIFTING MEANS FOR HAND BRAKES OF RAILWAY CARS

Roland J. Olander, Chicago, Ill., assignor to W. H. Miner, Inc., Chicago, Ill., a corporation of Delaware Application December 15, 1950, Serial No. 200,897

4 Claims. (Cl. 74—505)

This invention relates to improvements in clutch shifting means for power multiplying geared hand brakes of railway cars.

One object of the invention is to provide in a hand brake mechanism of the power multiplying worm gear operated type, clutch means controlled by rotation in one direction of the usual hand wheel of the brake mechanism for operatively connecting the worm gear to the usual chain winding drum and controlled by rotation of the hand wheel in a reverse direction for disconnecting the worm and drum after backing off of the brakes to a predetermined extent to permit free rotation of the drum to effect complete release of the brakes.

A more specific object of the invention is to provide a brake mechanism of the character indicated, comprising a worm element actuated by the usual hand wheel, a worm wheel driven by the worm, a chain winding drum, and a clutch connecting the drum to the worm wheel, wherein the clutch is operated by lever means actuated by a reciprocating slide having its movements controlled by rotation of the worm element of the brake mechanism.

Other objects of the invention will more clearly appear from the description and claims hereinafter following.

Figure 1:
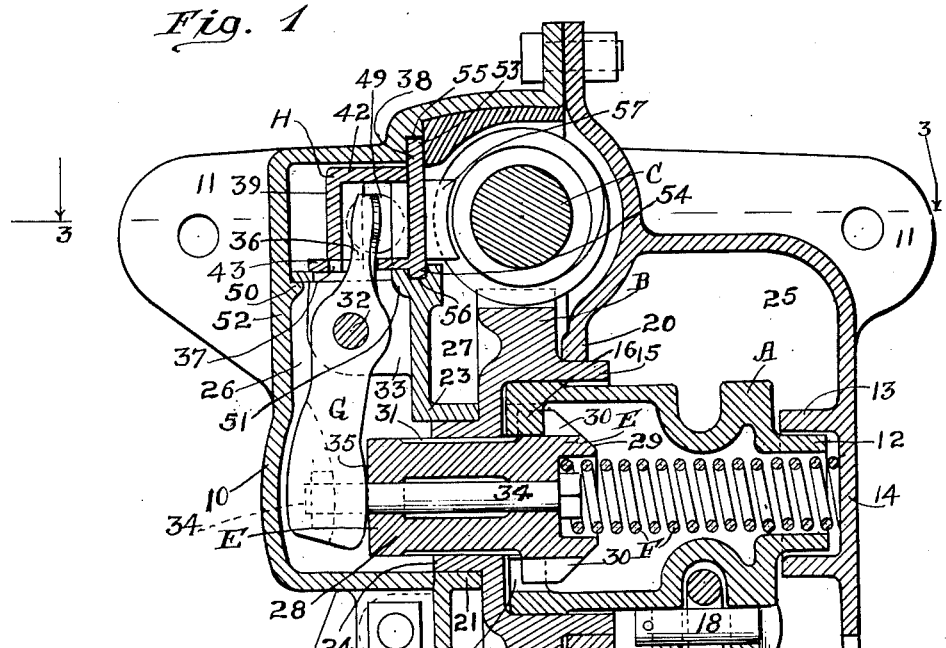
Figure 2:
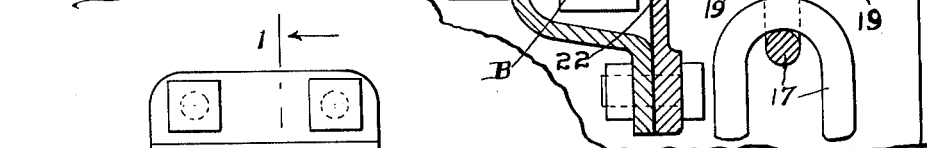
Figure 2:
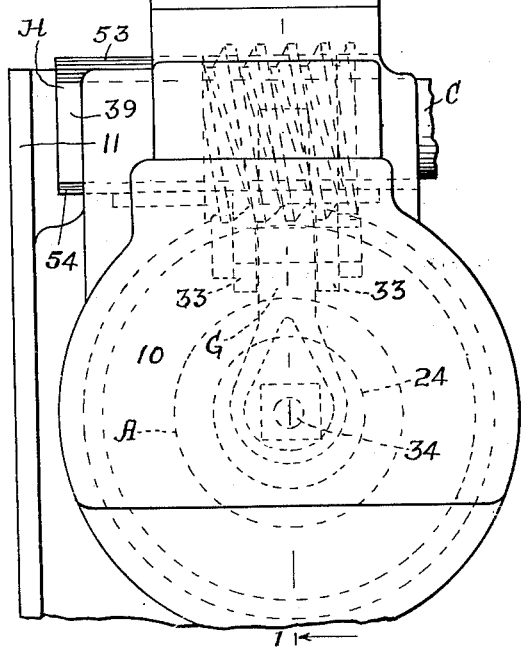
Figure 3:
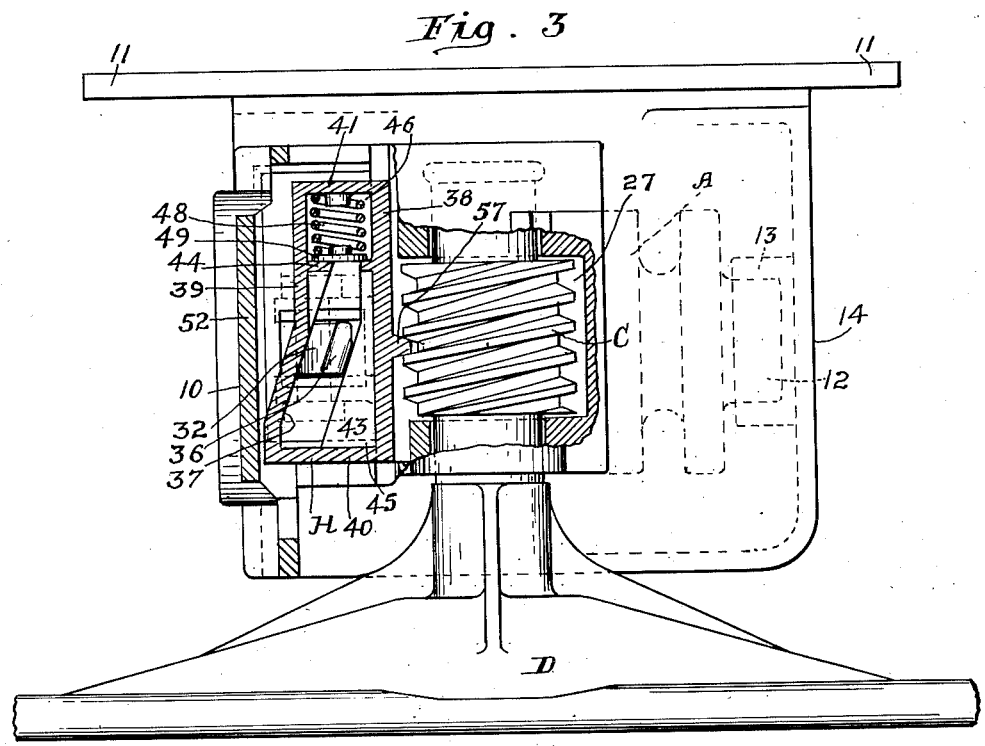
Figure 4:
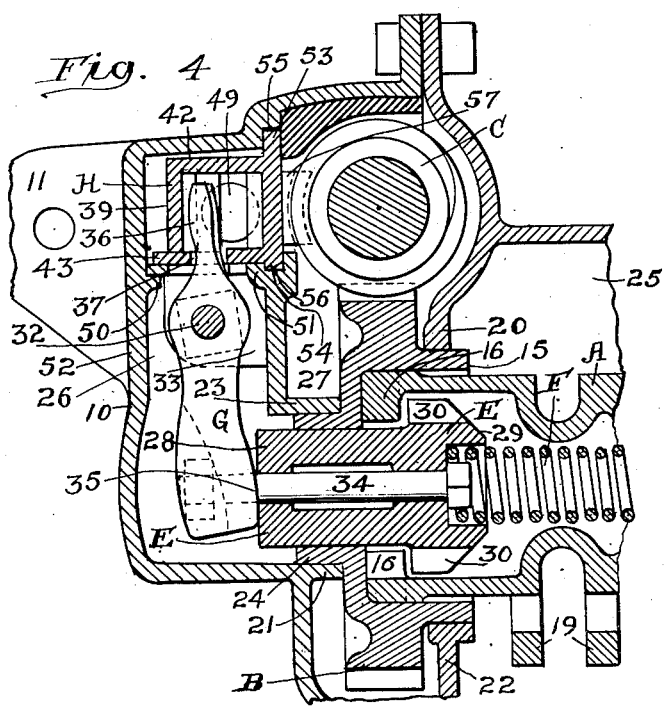
Figure 5:
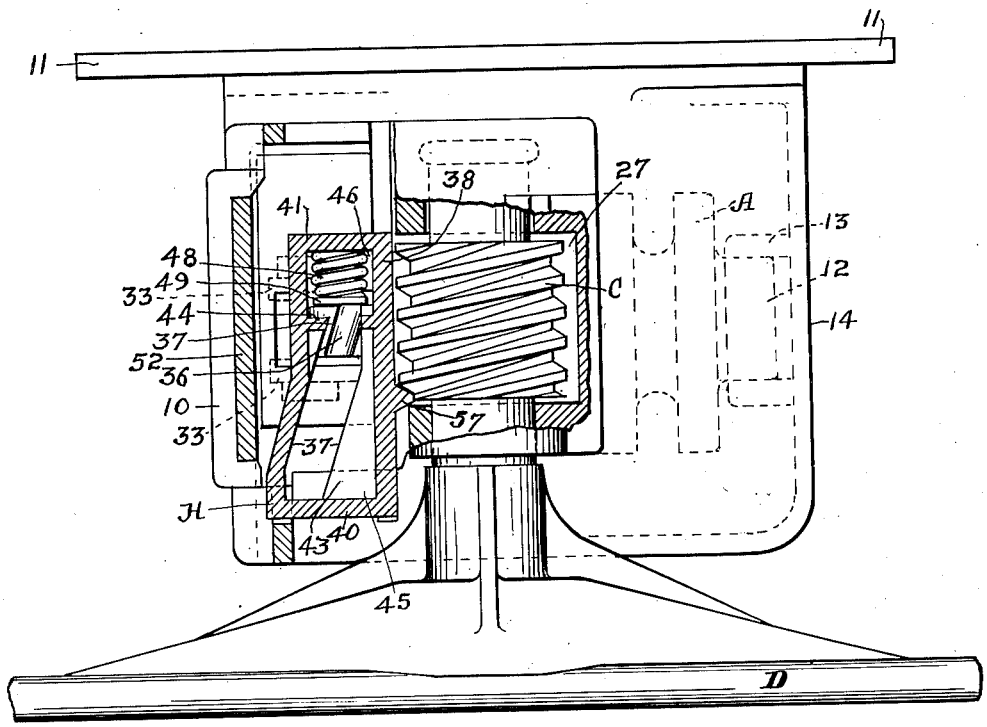

In the accompanying drawings forming a part of this specification, Figure 1 is a vertical sectional view, partly broken away, of a hand brake mechanism, illustrating my improvements in connection therewith, the mechanism being shown in the position occupied when mounted on the vertical end wall of a railway car, and the section being in a plane parallel to said wall, and corresponding to the line 1—1 of Figure 2. Figure 2 is a side elevational view of Figure 1, looking from left to right in said figure. Figure 3 is a horizontal sectional view, corresponding substantially to the line 3—3 of Figure 1, showing the clutch operating slide in its intermediate position. Figure 4 is a broken view similar to Figure 1, showing the parts in different positions. Figure 5 is a view similar to Figure 3, showing the clutch operating slide in its disengaged position with respect to the worm element of the brake mechanism. Figures 6, 7, and 8 are diagrammatic views of the clutch operating slide and cooperating parts, showing the same respectively in three different positions, the slide being shown in horizontal section and the other parts in dotted lines. Figure 9 is a broken, vertical sectional view, corresponding substantially to the line 9—9 of Figure 6.

In said drawings, the improved hand brake mechanism is illustrated as enclosed in a housing 10, having securing ears or lugs 11—11 on the rear wall thereof, adapted to accommodate fastening elements for securing the housing to the vertical end wall of a railway car.

My improved hand brake mechanism comprises broadly a chain winding drum A, a worm wheel B, a worm element C, a hand wheel D, a sliding clutch element E, a clutch spring F, a clutch shifting lever G, and a slide H for actuating the lever G.

The chain winding drum A is in the form of a hollow, cylindrical member, having a reduced bearing portion 12 at its right hand end journaled in a bearing sleeve 13, projecting from the right hand side wall 14 of the housing 10, as seen in Figure 1. The left hand end of the drum A is supported by the worm wheel B, the latter being provided with a hollow hub portion 15 at its right hand side into which the drum projects and within which the end of the same is journaled for rotation. At the left hand end, the drum is provided with interior clutch projections or teeth 16. The brake chain, which is indicated by 17, is wound on the drum A in the usual manner and has one end thereof fixed to the drum by means of a pin 18 extending through a pair of lugs 19—19 and the end link of the chain.

The worm wheel B is supported at opposite sides in bearings 20 and 21 provided in vertical partition walls 22 and 23 of the housing 10, the hub portion 15 being journaled in the bearing 20. At the left hand side thereof, as seen in Figure 1, the worm wheel B has a cylindrical hub portion 24 of reduced diameter, journaled in the bearing 21 in the partition wall 23.

The partition walls 22 and 23 of the housing 10 divide the latter into a relatively large right hand chamber 25, a smaller left hand chamber 26, and a small intermediate chamber 27, as viewed in Figure 1.

The worm element C is disposed above the worm wheel B within the chamber 27. The opposite ends of the worm element are journaled in bearings provided in the front and rear walls of the housing, and the hand wheel D is fixed to the outer end of said worm element, as clearly illustrated in Figures 3 and 5.

The sliding clutch element E comprises a cylindrical shank member 28 having a head 29 at its inner end provided with a plurality of clutch projections or teeth 30 engageable with the teeth 16 of the drum A. The shank member 28 of the clutch element E is slidable in the hub 24 of the worm wheel B and projects therefrom into the chamber 26. The clutch element E has a splined connection 31 with the worm wheel B to rotate in unison with the latter.

The clutch spring F is disposed within the hollow portion of the drum A and has its opposite ends bearing, respectively, on the clutch head 29 and the wall 14 of the housing 10. The spring F is under compression so that it normally holds the clutch element E in the engaged position shown in Figure 1.

The clutch shifting lever G is arranged within the chamber 26, being pivotally supported between its top and bottom ends by a pin 32 having its opposite ends fixed in laterally spaced flanges 33—33 projecting from the partition wall 23. The bottom end of the lever G is connected to the clutch element E by a bolt 34 extending through the bottom end of the lever and a central bore in said clutch element, the head of the bolt being shouldered against the inner end of the clutch element E and the nut of said bolt being shouldered against the outer side of the bottom end of the lever. The inner side of the bottom end portion of the lever G is rounded, as indicated at 35, and bears on the outer end of the clutch element E. The top end portion of the lever G, above the pivot thereof, is of reduced size, as indicated at 36, said reduced portion being of the transverse shape shown in Figures 3 and 5.

The slide H is arranged within the top portion of the chamber 26 and has a lengthwise extending cam slot 37 therein, into which the top end portion of the lever G extends. The slide H is in the form of an elongated hollow member of the shape shown in the drawings and particularly in Figures 1, 3, 5, 6, 7, 8, and 9, being provided with spaced vertical side walls 38 and 39, front and rear end walls 40 and 41, a top wall 42, and a bottom wall 43. As clearly shown, the slot 37 of this slide is formed in the bottom wall 43. A transverse vertical partition wall 44 divides the slide into large and small pockets 45 and 46. The partition wall 44 is provided with a central vertical opening 47, through which the top end portion of the lever may be projected, as shown in Figures 5 and 6. A coil spring 48 is arranged in the pocket 46 and has its opposite ends bearing on the end wall 41 of the slide and a spring follower 49, which is arranged to engage the rear side of the upper end portion of the lever G. The follower 49 is of greater width than the opening 47 in the wall 44, so that it has its movement limited by engagement with said wall. The spring 48 is under initial compression and tends to force the slide H rearwardly away from the lever G when the latter is engaged with the follower 49.

The slide H is supported for sliding movement on ribs or flanges 50 and 51 formed on the left hand outer side wall 52 of the housing 10 and on the partition wall 23. The slide H is restricted to straight line reciprocating movement by top and bottom flanges 53 and 54 formed on the wall 38 of said slide and guided in grooves 55 and 56 provided in the housing 10. Formed on the outer side of the wall 38 of the slide H is a vertically extending, inclined rib 57 forming an interrupted thread member adapted to mesh with the threads of the worm element C, which threads are right hand, as shown.

As shown in Figures 5 and 6, the spring 48 normally tends to project the slide H rearwardly to press the rib 57 against the end thread of the worm element C so that, when the worm element is rotated in left hand or brake releasing direction, the rib 57 will be threaded onto the worm element to move the slide rearwardly as shown in Figures 3, 7, and 8, and will idle or cam over the ends of the threads of the worm element when the latter is rotated in chain winding direction.

The operation of my improved hand brake mechanism in applying the brakes is as follows: With the parts in the positions shown in Figures 1, 5, and 6, the hand wheel D is rotated in right hand direction, as viewed in said figures, thereby rotating the worm element C and the intermeshing worm wheel B. Inasmuch as the clutch element E is rotatable in unison with the worm wheel B, and the clutch element is engaged with the chain winding drum A, the latter will be rotated thereby, effecting winding of the chain on the drum and tightening of the brakes. During this operation, the thread or rib 57 of the slide idles over the threads of the worm element C, as hereinbefore pointed out, and the slide remains in a stationary position with the thread thereof pressed against the threads of the worm element.

In releasing the brakes, the hand wheel D is rotated in contraclockwise, or left hand direction, as viewed in Figure 1, thereby effecting rotation of the worm element in a direction reverse to that while the brakes are being applied. During this contraclockwise rotation of the worm element C, the rib or thread 57 of the slide H will be brought into mesh with the threads of the worm element, as hereinbefore described, and threaded rearwardly on said worm element to move the slide rearwardly from the position shown in Figure 6, through the position shown in Figure 7, toward the position shown in Figure 8. During this action the lever G, through camming action of the slide H, shifts the clutch element E from the engaged position shown in Figure 1 to the disengaged position shown in Figure 4, thereby releasing the brakes through free running of the drum A. As will be evident, the movement of the slide H does not immediately effect disengagement of the clutch element E, the slide being moved from the position shown in Figures 1 and 6 to the position shown in Figures 3 and 7, before any camming action of the same on the lever G is produced. Thus, as the lever moves from the position shown in Figures 3 and 7 to the position shown in Figure 8, the upper end of the lever G is gradually cammed outwardly to actuate the same and effect complete disengagement of the clutch element E, as shown in Figure 4. This delayed action of the lever G permits a predetermined desired amount of backing off of the brakes before quick release is effected by disengagement of the clutch element from the chain winding drum A.

I claim:

1. In a hand brake mechanism, the combination with a rotary chain winding member; of a rotary driving member; a reciprocating clutch operatively connecting said winding member and driving member; a manually actuated worm element operatively meshing with the driving member for rotating the same in reverse directions; a pivoted lever for reciprocating said clutch; and a reciprocable slide having a riblike thread thereon engageable with the worm element to be actuated thereby, said slide having a lengthwise extending cam slot therein within which the lever is engaged.

2. In a hand brake mechanism, the combination with a chain winding member rotatable about a horizontal axis; a driving member rotatable about a horizontal axis; a reciprocating clutch element connecting said winding member to the driving member; a worm element above said driving member in mesh with the latter; a vertically disposed clutch actuating lever pivoted between its ends and having its lower end operatively engaged with the clutch element; a slide having a cam slot within which the upper end of said lever has camming engagement, said slide being mounted for sliding movement lengthwise with respect to said worm element; and a partial thread on said slide engageable with said worm element to effect reciprocating movement of said slide as the worm element is rotated in reverse directions.

3. In a hand brake mechanism, the combination with a chain winding member rotatable about a horizontal axis; a driving member rotatable about a horizontal axis; a reciprocating clutch element connecting said winding member to the driving member; a worm element above said driving member in mesh with the latter; a vertically disposed clutch actuating lever pivoted between its ends and having its lower end operatively engaged with the clutch element; a slide having a slot within which the upper end of said lever has camming engagement, said slide being mounted for sliding movement lengthwise with respect to said worm element; a partial thread on said slide engageable with said worm element to effect reciprocating movement of said slide as the worm element is rotated in reverse directions; and a spring reacting between the upper end of said lever and said slide for forcing the slide away from said lever to press the partial thread thereof against the front ends of the threads of the worm element.

4. In a hand brake mechanism, the combination with a rotary chain winding member; of a rotary gear member; a threaded worm element meshing with said gear member; a reciprocable slide having a partial thread adapted to be engaged by the threads of said worm element, said slide having a cam slot therein; a rocking clutch shifting lever, said lever having an actuating arm engaged within said cam slot of the slide; and yielding means reacting between said actuating arm of the lever and said slide to force the slide in lengthwise direction inwardly of the worm element.

ROLAND J. OLANDER.

References Cited in the file of this patent

UNITED STATES PATENTS

| Number | Name | Date |
|---|---|---|
| 1,928,027 | Olander | Sept. 26, 1933 |
| 2,457,764 | Williams | Aug. 7, 1948 |
| 2,485,026 | Williams | Oct. 18, 1949 |